United States Patent
Ishii et al.

(10) Patent No.: US 7,078,701 B2
(45) Date of Patent: Jul. 18, 2006

(54) RADIOGRAPHIC APPARATUS AND RADIOGRAPHIC SYSTEM

(75) Inventors: Takamasa Ishii, Saitama (JP); Masakazu Morishita, Kanagawa (JP); Tatsuya Yamazaki, Tochigi (JP); Osamu Tsujii, Tochigi (JP); Akira Hirai, Tochigi (JP); Toshikazu Tamura, Tochigi (JP); Hideki Nonaka, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 267 days.

(21) Appl. No.: 10/762,611

(22) Filed: Jan. 21, 2004

(65) Prior Publication Data

US 2004/0149920 A1 Aug. 5, 2004

(51) Int. Cl.
*H04N 5/32* (2006.01)

(52) U.S. Cl. .............................. 250/370.08; 250/370.01

(58) Field of Classification Search ........... 250/370.08, 250/370.01, 370.09, 336.1; 378/98.7

See application file for complete search history.

(56) References Cited

U.S. PATENT DOCUMENTS

| | | | |
|---|---|---|---|
| 5,448,613 A | 9/1995 | Haendle et al. | |
| 5,585,638 A | 12/1996 | Hoffman | |
| 5,773,832 A | 6/1998 | Sayed et al. | |
| 5,937,027 A | 8/1999 | Thevenin et al. | |
| 6,967,332 B1* | 11/2005 | Kobayashi et al. | 250/370.09 |
| 2002/0181648 A1 | 12/2002 | Ruetten et al. | |
| 2003/0213914 A1* | 11/2003 | Kobayashi et al. | 250/370.09 |
| 2004/0041097 A1* | 3/2004 | Ishii et al. | 250/370.07 |
| 2004/0101100 A1* | 5/2004 | Morii et al. | 378/98.7 |

FOREIGN PATENT DOCUMENTS

EP    1 001 665    5/2000

* cited by examiner

*Primary Examiner*—Otilia Gabor
(74) *Attorney, Agent, or Firm*—Morgan & Finnegan, LLP

(57) ABSTRACT

Image sensing radiation detection pixels of m (columns)×n (rows) are divided into, e.g., 72 pixel regions. Image sensing radiation detection pixels belonging to one pixel region are connected to the same read TCP and driving TCP. For example, three regions (AEC radiation detection regions) of the 72 pixel regions have a plurality of AEC radiation detection pixels. An AEC radiation detection pixel has a TFT sensor. Spare wiring lines for the AEC radiation detection pixels are arranged at two side portions of each read TCP. Each spare wiring line is connected to a predetermined circuit in a read device to connect the AEC radiation detection pixels to the predetermined circuit so that the AEC circuit is operated.

9 Claims, 12 Drawing Sheets

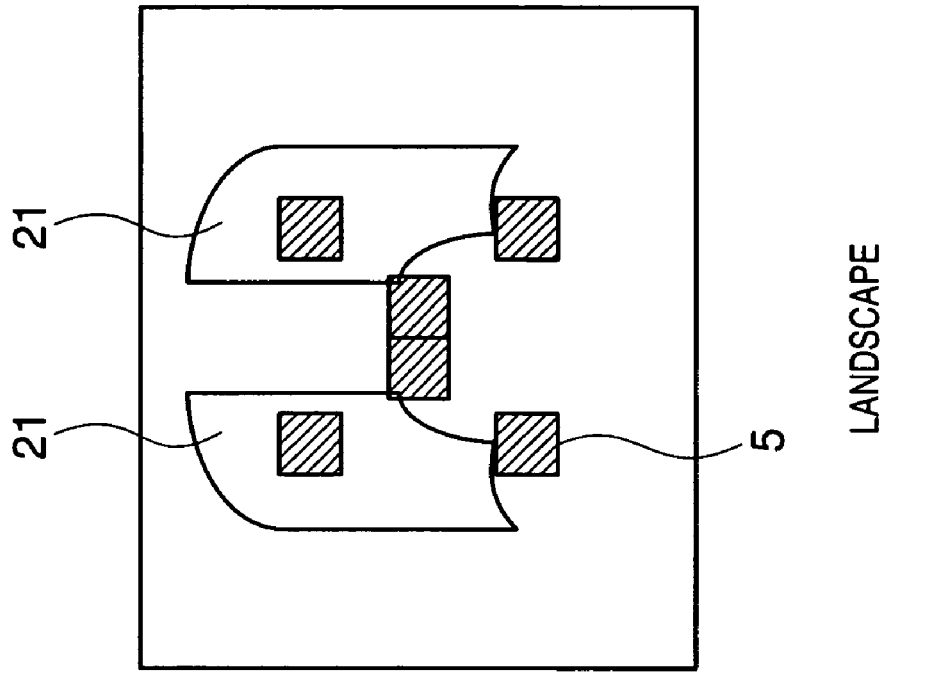
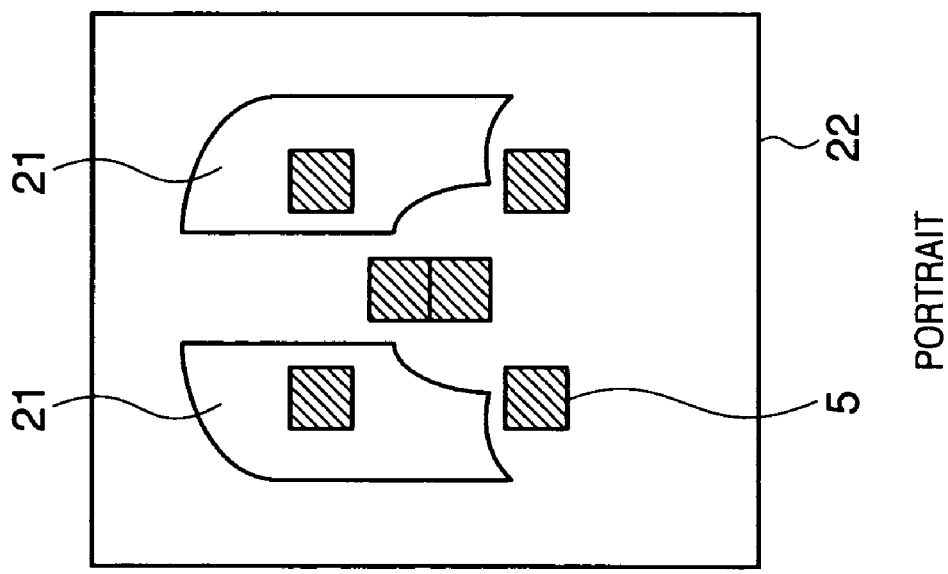

PORTRAIT
PRIOR ART

LANDSCAPE
PRIOR ART

RADIOGRAPHIC APPARATUS AND RADIOGRAPHIC SYSTEM

FIELD OF THE INVENTION

The present invention relates to a radiographic apparatus and radiographic system which can suitably be used for a medical image diagnostic apparatus, nondestructive inspection apparatus, analyzing apparatus using radiation, and the like. In this specification, radiation includes visible light and electromagnetic waves such as and X-rays in addition to α-rays, β-rays, and γ-rays.

BACKGROUND OF THE INVENTION

As a method of irradiating an object with radiation and detecting the intensity distribution of the radiation transmitted through the object to obtain the radiographic image of the object, a technique has recently been developed, in which a digital image is acquired by using a photoelectric conversion apparatus in which pixels comprised of small photoelectric conversion devices and switching devices are arrayed in a matrix. Such radiographic apparatuses can immediately display acquired image data.

In a conventional radiographic apparatus, when the amount of radiation that reaches the apparatus enters a low region, the effect of quantization noise due to the decrease in arrival information amount and system noise inherent in the apparatus become large, and the S/N ratio of the image decreases. To ensure the minimum necessary quality of an acquired image, an X-ray automatic exposure control (AEC) circuit called a phototimer is used in order to obtain a minimum arrival radiation amount. As shown in FIGS. 8A and 8B, radiation detection devices used in the AEC circuit constitute two or three AEC radiation detection regions 5 so that the apparatus can be used for radiography of both chest and belly parts.

In a flat panel detector (FPD) which uses solid-state photodetection devices as image sensing devices of a radiographic apparatus, the AEC circuit is operated while arranging radiation detection devices separate from the FPD in front of it, as disclosed in U.S. Pat. No. 5,585,638.

SUMMARY OF THE INVENTION

However, when a separate AEC control sensor is used to adjust (AEC-control) the incident radiation amount, the position of the sensor poses a problem. That is, to arrange the AEC control sensor in front of the FPD without interfering with image sensing by an image sensing sensor, attenuation of radiation by the AEC control sensor must be very small. Hence, the cost of the entire apparatus increases. In addition, there is no sensor that causes no attenuation at all, the quality of sensed images inevitably degrades.

The present invention has been made in consideration of the above problem, and has as its object to provide a radiographic apparatus which can automatically adjust the incident radiation amount while suppressing attenuation of radiation before detection.

The present inventors made it possible to arrange AEC radiation detection devices inside an FPD in order to meet requirements for compact and simple apparatuses, cost reduction, and advanced manufacturing techniques. In this case, however, the AEC radiation detection devices are required to be arranged without interfering with the operation of image sensing radiation detection pixels. More specifically, the arrangement of a part where a signal is read from an insulating substrate that forms the FPD through a printed wiring board such as a TCP (Tape Carrier Package) is required to be optimized. Interfering with the operation of image sensing radiation detection pixels indicates the followings. When AEC radiation detection pixels are arranged in the FPD, the wiring pattern of the image sensing radiation detection pixels near the AEC radiation detection pixels becomes different from the remaining parts. Since the wiring capacitance increases, noise increases. In addition, since the opening ratio of the image sensing radiation detection pixels greatly decreases, the image quality becomes poor.

A radiographic apparatus according to the present invention is characterized by comprising a substrate, a conversion portion which includes a plurality of first semiconductor conversion devices that are arranged on the substrate in a matrix to convert radiation into an electrical signal, and switching devices that are connected to each of the plurality of first semiconductor conversion devices, a plurality of second semiconductor conversion devices which are arranged on the substrate to convert radiation into an electrical signal to detect irradiation of radiation incident on the conversion portion, and wiring lines which are connected to each of the plurality of first semiconductor conversion devices, and connected to a plurality of printed wiring boards, wherein the second semiconductor conversion devices are collectively arranged in a region where the first semiconductor conversion devices which are connected to at least one specific printed wiring board selected from the plurality of printed wiring boards are collectively arranged.

In the present invention, AEC control can be performed on the basis of the radiation amount detected through the second semiconductor conversion devices. Since the second semiconductor conversion devices are formed on the same substrate as that of the first semiconductor conversion devices, radiation attenuation by the second semiconductor conversion devices does not occur. In addition, the second semiconductor conversion devices are collectively arranged in a region where the first semiconductor conversion devices connected to a specific printed wiring board are collectively arranged. That is, the second semiconductor conversion devices are collectively arranged for each printed wiring board such as a TCP. For this reason, the second semiconductor conversion devices do not interfere with the operation of the first semiconductor conversion devices.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 7A and 7B are schematic views showing the positional relationship between AEC radiation detection regions and a pulmonary part;

DETAILED DESCRIPTION OF THE PREFERRED EMBODIMENTS

Radiographic apparatuses according to the preferred embodiments of the present invention will be described below in detail with reference to the accompanying drawings.

First Embodiment

Figure 1:
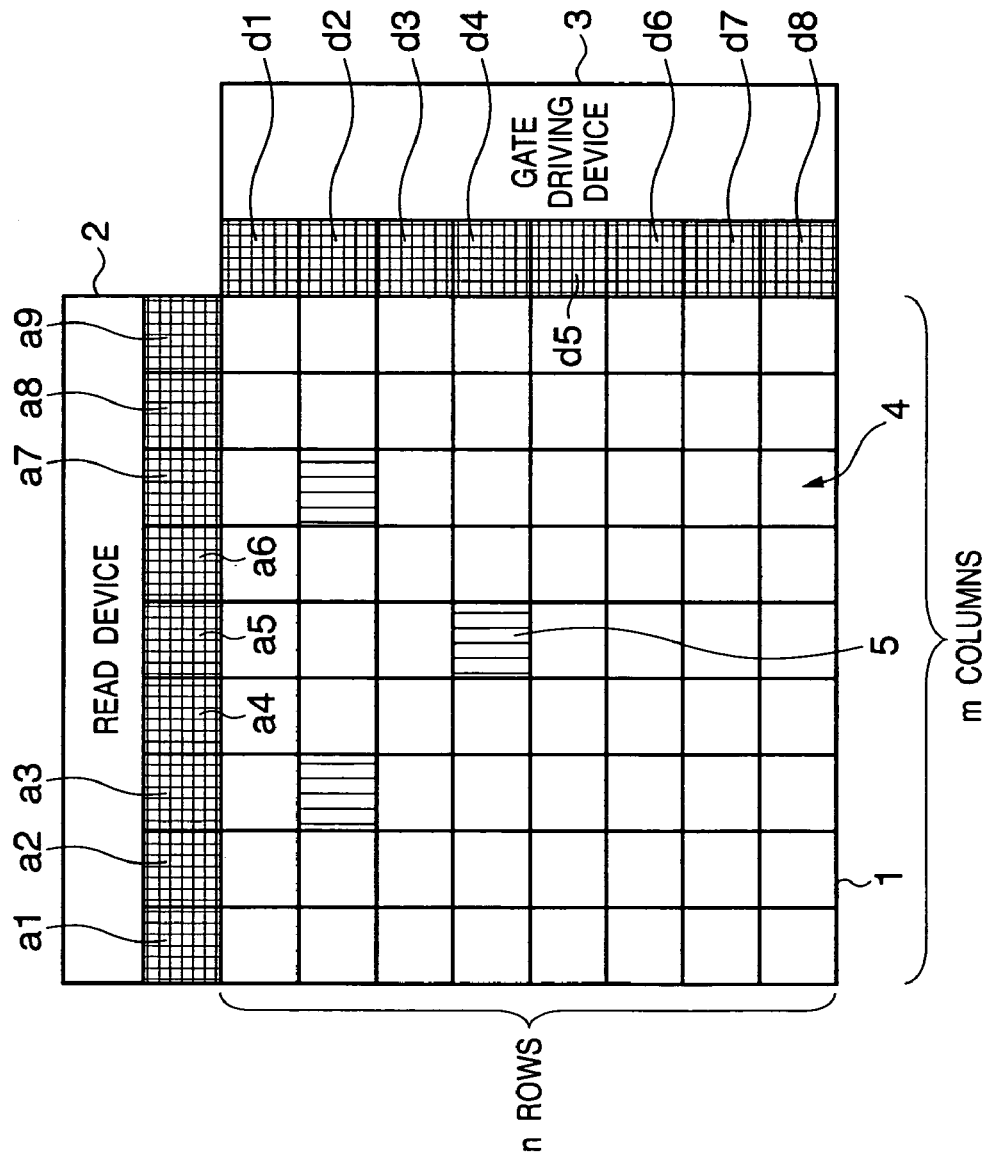
FIG. 1 is a schematic view showing the layout of a radiation detection apparatus according to the first embodiment of the present invention.

The first embodiment of the present invention will be described. FIG. 1 is a schematic view showing the layout of a radiation detection apparatus according to the first embodiment of the present invention.

In this embodiment, m (columns)×n (rows) image sensing radiation detection pixels are arranged in a matrix on an insulating substrate 1. An image sensing radiation detection pixel has a conversion portion which is constituted by an MIS photoelectric conversion device (first semiconductor conversion device) and a read thin-film transistor (TFT) (switching device) to convert radiation into an electrical signal. The image sensing radiation detection pixels of m columns are divided into, e.g., nine groups. The image sensing radiation detection pixels of each group are connected to a corresponding one of read TCPs a1 to a9. The image sensing radiation detection pixels of n rows are divided into, e.g., eight groups. The image sensing radiation detection pixels of each group are connected to a corresponding one of driving TCPs d1 to d8. The read TCPs a1 to a9 and driving TCPs d1 to d8 are formed by mounting semiconductor chips on a tape having wiring lines by TAB (Tape Automated Bonding). The read TCPs a1 to a9 are connected to a read device 2. The driving TCPs d1 to d8 are connected to a gate driving device 3.

As described above, the image sensing radiation detection pixels of m columns are divided into nine groups. The image sensing radiation detection pixels of n rows are divided into eight groups. In this case, the m (columns)×n (rows) image sensing radiation detection pixels are divided into 72 pixel regions 4 in accordance with the division. Image sensing radiation detection pixel belonging to one pixel region 4 are connected to the same read TCP and driving TCP.

In this embodiment, three of the 72 pixel regions 4 have a plurality of AEC radiation detection pixels. The read TCPs a3, a5, and a7 are specific printed wiring boards. Each AEC radiation detection pixel has a TFT sensor (second semiconductor conversion device). In this specification, some of the pixel regions 4, which have the AEC radiation detection pixels, are called AEC radiation detection regions 5.

Figure 2:
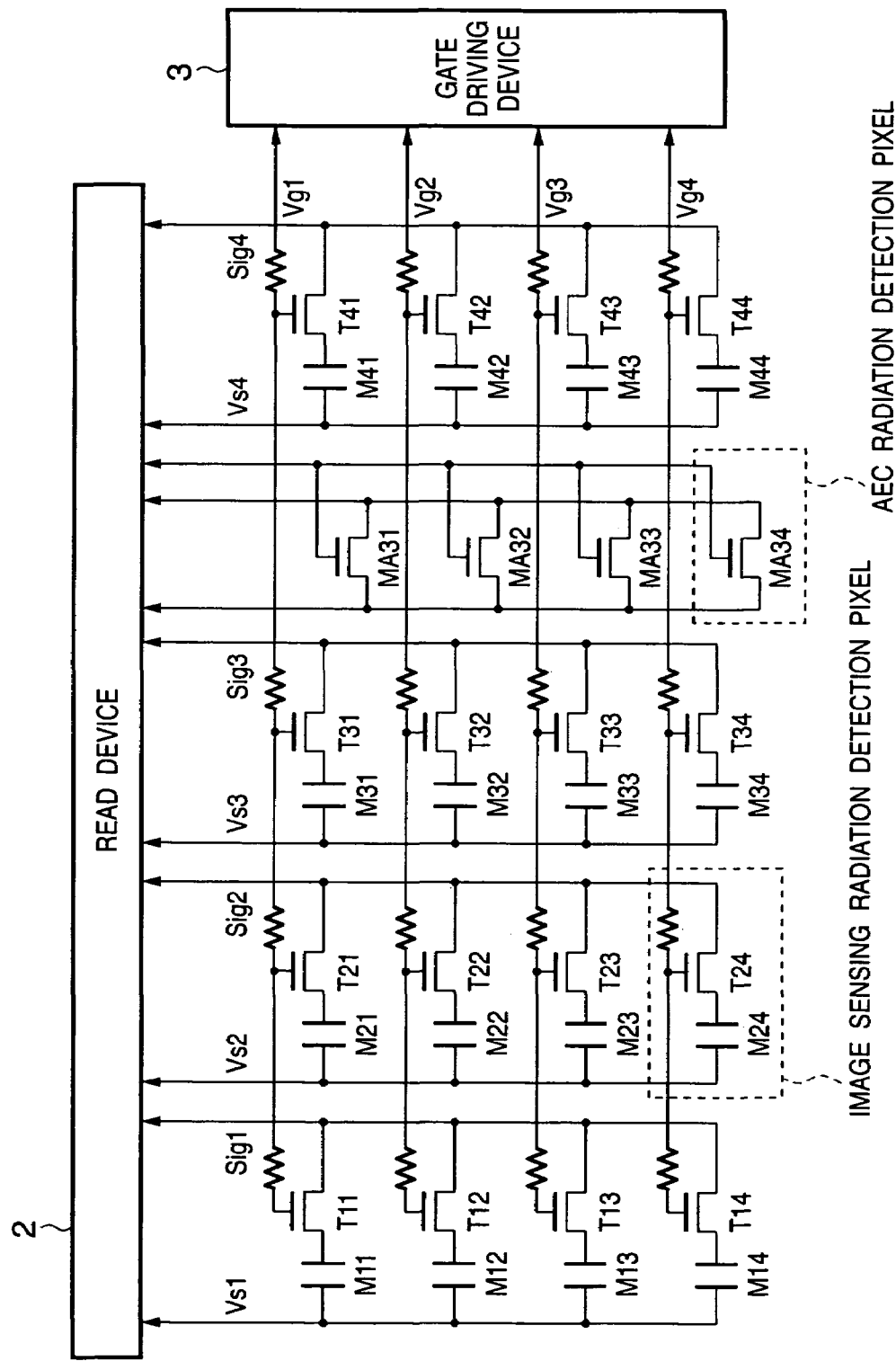
FIG. 2 is an equivalent circuit diagram showing the circuit arrangement of an AEC radiation detection region in the radiographic apparatus according to the first embodiment.
Figure 3:
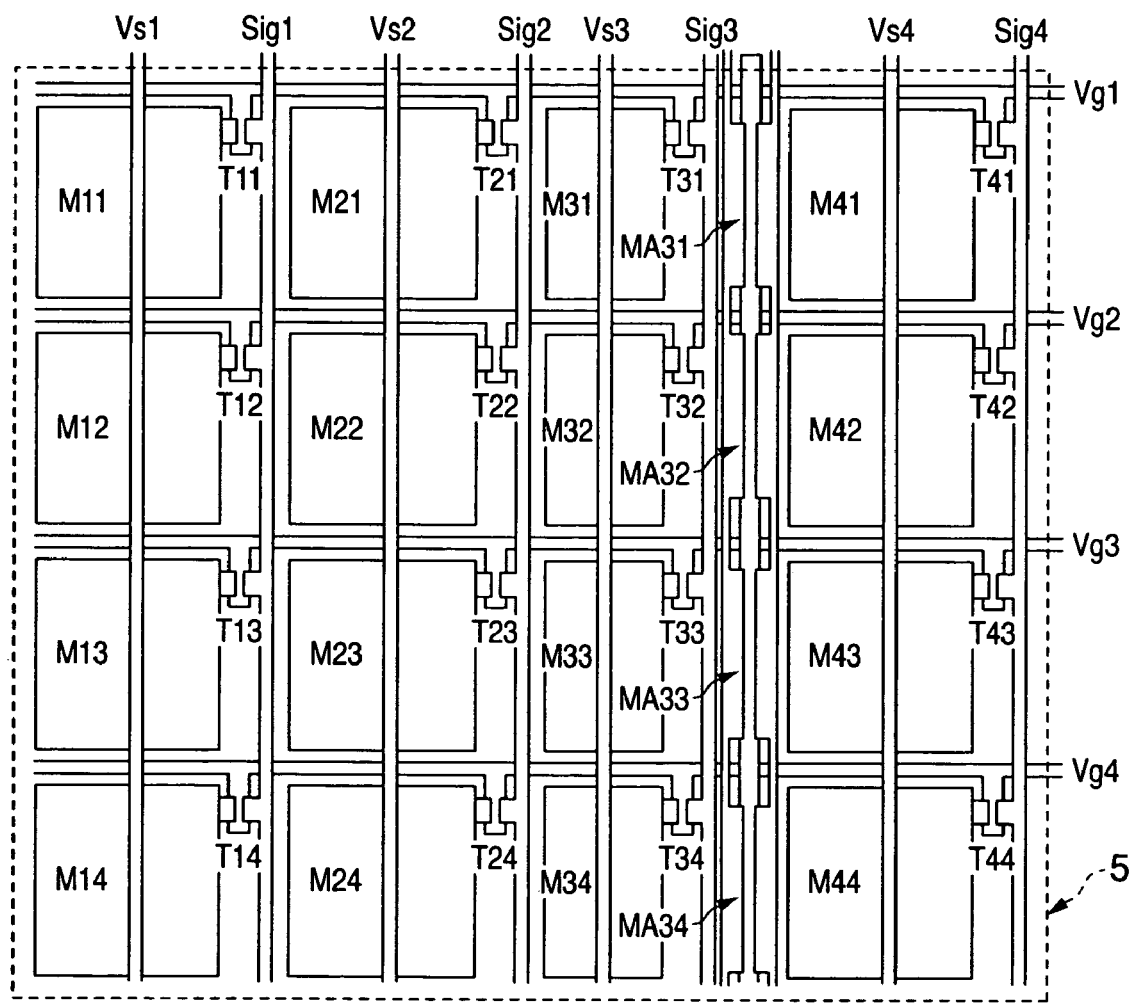
FIG. 3 is a schematic view showing the layout of the AEC radiation detection region 5.

The structure of the AEC radiation detection region 5 will be described next. FIG. 2 is an equivalent circuit diagram showing the circuit arrangement of the AEC radiation detection region 5 in the radiographic apparatus according to the first embodiment. FIG. 3 is a schematic view showing the layout of the AEC radiation detection region 5.

For example, 4 (rows)×4 (columns) (=16) image sensing radiation detection pixels are arranged in one AEC radiation detection region 5. The image sensing radiation detection pixel of the ath row and bth column from the upper side of FIGS. 2 and 3 has a photoelectric conversion device Mba and thin-film transistor Tba (a, b=1, 2, 3, 4). In addition, 1 (column)×4 (rows) (=4) AEC radiation detection pixels are arranged in a line between the image sensing radiation detection pixels of the third column and those of the fourth column. The AEC radiation detection pixel of the ath row from the upper side of FIGS. 2 and 3 has a TFT sensor MA3a.

Four MIS photoelectric conversion devices arranged on the bth column are connected to a common bias line Vsb so that a predetermined bias is applied from the read device 2 to the MIS photoelectric conversion devices. The gate electrodes of four read TFTs arranged on the ath row are connected to a common gate line Vga so that the gates are ON/OFF-controlled by the gate driving device 3. The source electrodes or drain electrodes of four read TFTs arranged on the bth column are connected to a common signal line Sigb. Signal lines Sig1 to Sig4 are connected to the read device 2.

Figure 4:
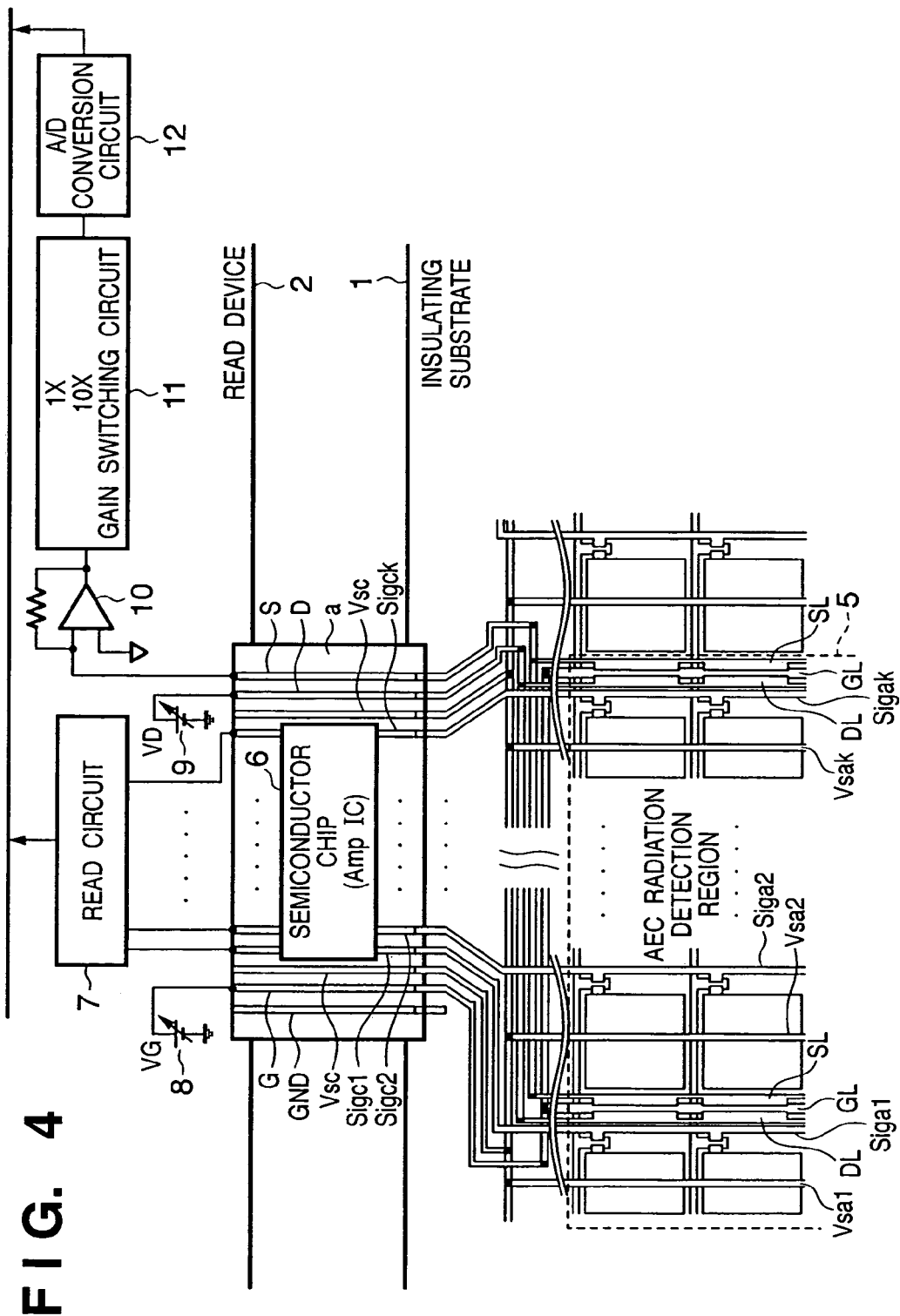
FIG. 4 is a schematic view showing the connection relationship between a read TCP a and the AEC radiation detection region 5.

The connection relationship between the read and driving TCPs and the electrodes of the pixels will be described next. FIG. 4 is a schematic view showing the connection relationship between a read TCP a and the AEC radiation detection region 5. FIGS. 2 and 3 show an AEC radiation detection region in which four columns of image sensing radiation detection pixels and only one column of AEC radiation detection pixels are arranged. FIG. 4 shows an AEC radiation detection region in which k columns of image sensing radiation detection pixels and a plurality of columns of AEC radiation detection pixels are arranged.

As shown in FIG. 4, the read TCP a has a semiconductor chip (Amp IC) 6 of an amplifier. Signal input lines Sigc1 to Sigck to which the output signals from signal lines Siga1 to Sigak of the image sensing radiation detection pixels are input and signal output lines which amplify the signals input from the signal input lines and output the amplified signals to the read device 2 are connected to the semiconductor chip 6. The read TCP a also has a bias link line Vsc and a spare wiring line G, spare wiring line S, and spare wiring line D. The bias link line Vsc is connected to bias lines Vsa1 to Vsak of the image sensing radiation detection pixels and links to the read device 2. The spare wiring line G, spare wiring line S, and spare wiring line D are connected to a gate line GL, source line SL, and drain line DL of the TFT sensor of each of the AEC radiation detection pixels that form columns and link to the read device 2. The read TCP a also has a spare wiring line GND.

The driving TCP has a semiconductor chip (driver IC) (not shown). A gate pulse output line which applies a gate driving pulse to the gate line of an image sensing radiation detection pixel is connected to the semiconductor chip.

In the AEC radiation detection region 5, the bias lines Vsa1 to Vsak are shared by all the columns of image sensing radiation detection pixels and connected to the bias link line Vsc of the read TCP a. The signal lines Siga1 to Sigak are connected to the signal input lines Sigc1 to Sigck of the read TCP a, respectively. For the TFT sensors of the AEC radiation detection pixels, the source line SL, drain line DL, and gate line GL are shared by all the columns in the AEC radiation detection region 5 and connected to the spare wiring line S, spare wiring line D, and spare wiring line G of the read TCP a.

The read device 2 has a read circuit 7 which reads the signal output from the semiconductor chip 6, a DC power supply 8 which supplies a constant voltage VG to the spare wiring line G, a DC power supply 9 which supplies a constant voltage VD to the spare wiring line D, and an amplifier 10, gain switching circuit 11, and A/D conversion circuit 12 to which the spare wiring line S is connected. Although not illustrated, wiring lines connected to the DC power supply 8, DC power supply 9, and amplifier 10 are shared in the read device 2 and connected to the spare wiring lines of all the read TCPs.

The operation of the radiographic apparatus according to the first embodiment, which has the above-described arrangement, will be described next with reference to FIGS. 2, 3, and 4.

On the radiographic apparatus having the above-described arrangement, an object such as a human body is irradiated with X-rays. The X-rays pass through the object while being attenuated by it, and is converted into visible light by a phosphor layer (not shown). The visible light becomes incident on an MIS photoelectric conversion device M11 and is converted into charges. The charges are transferred to the signal line Sig1 through a read TFT T11 in accordance with a gate driving pulse applied by the gate driving device 3 and output to an external device through the read device 2. After that, charges that are generated in the read TFT T11 but not transferred are removed from a common bias line Vs1.

On the other hand, for TFT sensors MA31 to MA34, for example, a predetermined bias that depletes the semiconductor layer of a TFT is applied between the gate and drain electrodes from the DC power supplies 8 and 9 through the spare wiring lines G and D. When the predetermined bias is applied in advance, charges corresponding to incident light are always output. Hence, when the output value is amplified by the amplifier (AMP) 10 and added, the total dose of X-rays can be detected by the read device. X-ray irradiation is controlled on the basis of the total dose of X-rays.

Figure 11:
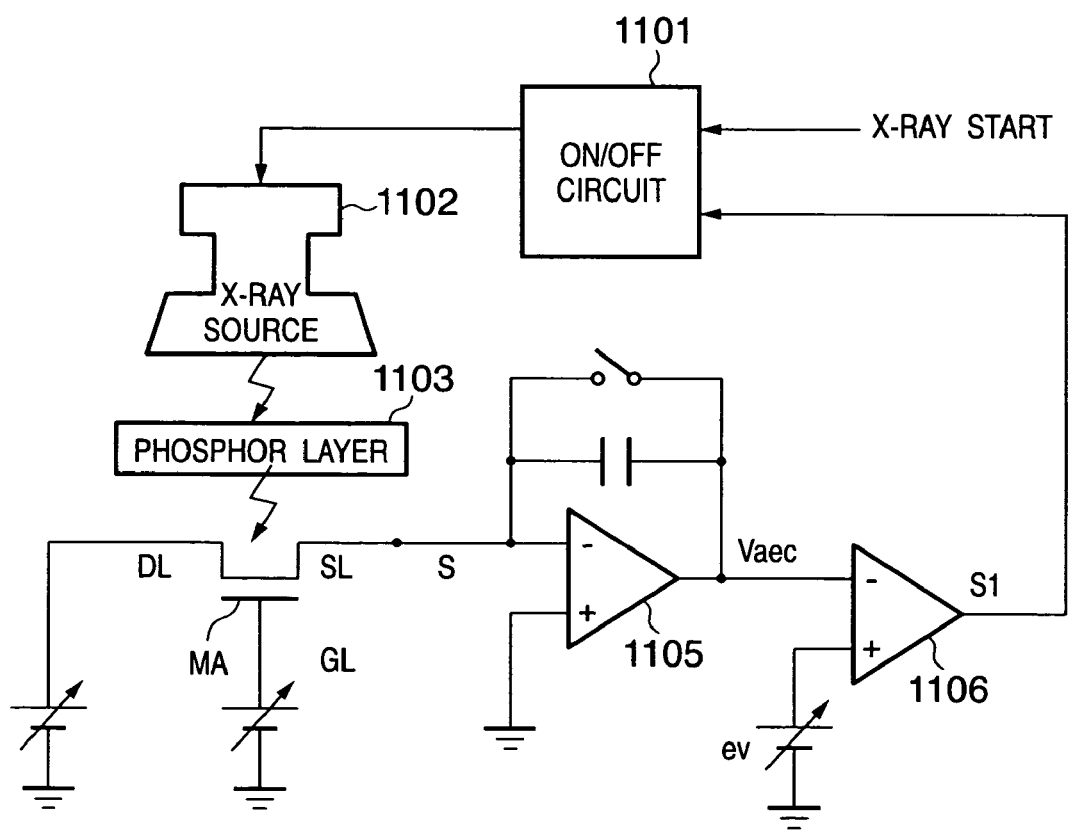
FIG. 11 is a schematic view showing a TFT sensor and AEC circuit according to a preferred embodiment of the present invention.
Figure 12:
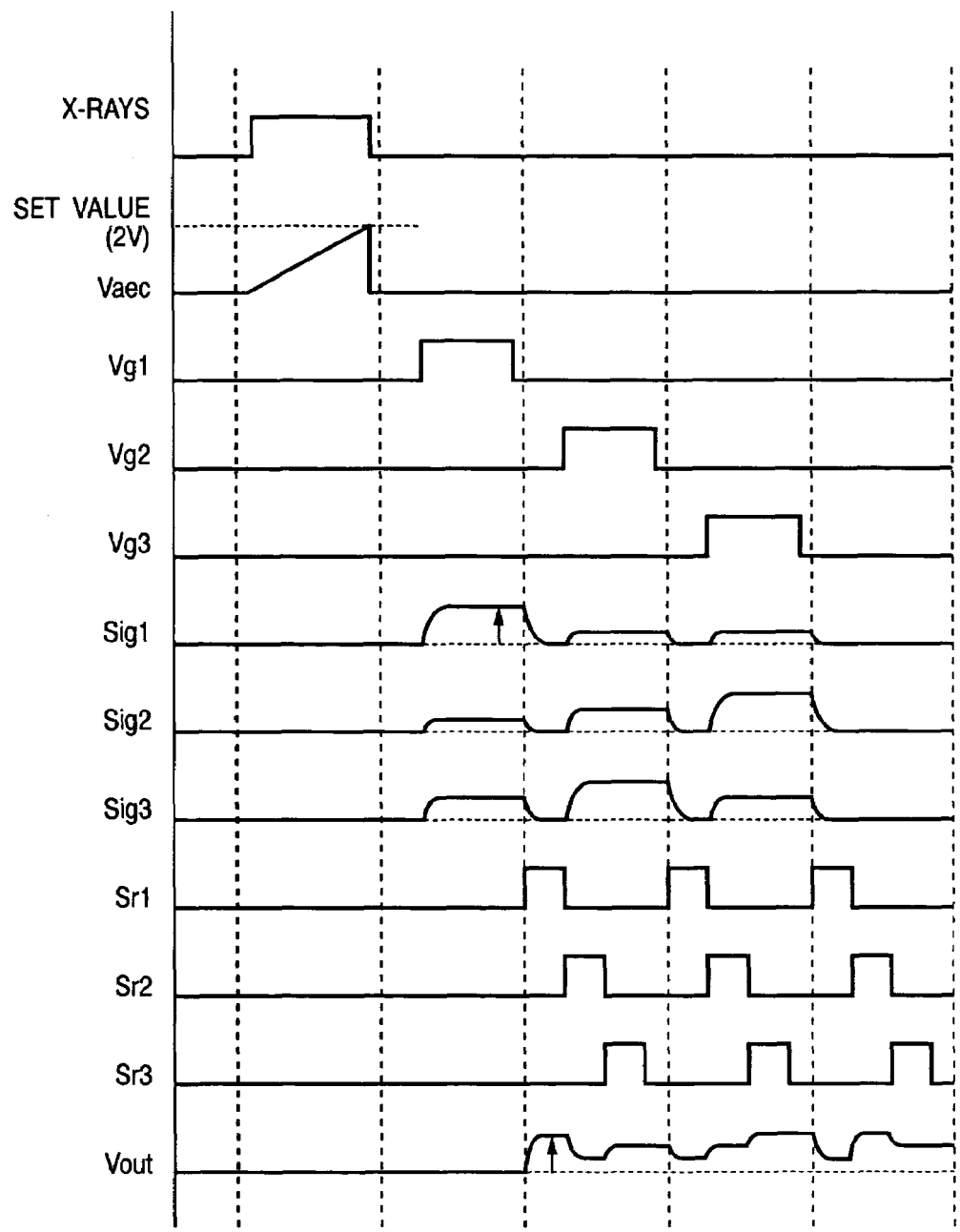
FIG. 12 is a timing chart showing the driving timing in FIG. 11.

FIG. 11 is a schematic view of a TFT sensor serving as an AEC radiation detection pixel and an AEC circuit. FIG. 12 is a timing chart showing the driving timing of this embodiment. The driving timing will be described with reference to FIGS. 2, 4, 11, and 12.

When an X-ray START signal is input to an ON/OFF circuit 1101, X-rays are emitted from an X-ray source 1102. The X-rays pass through the object while being attenuated by it and are wavelength-converted, by a phosphor layer 1103, into light (visible light) that can be sensed by an MIS photoelectric conversion device (Mab in FIG. 2) and TFT sensor MA. The wavelength-converted light becomes incident on the MIS photoelectric conversion device and TFT sensor MA. Charges are generated in each device.

The charges generated by the TFT sensor MA are integrated by an integration circuit 1105 through the spare wiring line S as voltage value Vaec. When Vaec reaches the set value (e.g., 2 V) of a comparison circuit 1106, an X-ray OFF signal S1 is input from the comparison circuit 1106 to the ON/OFF circuit 1101. Accordingly, the X-rays are cut off (FIG. 12).

In the above description and FIG. 11, the analog integration circuit 1105 is used. However, the output from the TFT sensor MA may be A/D-converted, written in a memory (not shown), and compared with the set value by an arithmetic circuit, as shown in FIG. 4.

Next, the charges generated by the MIS photoelectric conversion device are read out. Referring to FIG. 2, the read operation is executed in an order of MIS photoelectric conversion devices M11 to M41 of the first row, MIS photoelectric conversion devices M12 to M42 of the second row, and MIS photoelectric conversion devices M13 to M43 of the third row. First, to read MIS photoelectric conversion devices M11 to M41 of the first row, a gate pulse is applied to a gate line Vg1 of switching devices (TFTs) T11 to T41 (FIG. 12). The switching devices T11 to T41 are turned on to transfer the charges accumulated in the MIS photoelectric conversion devices M11 to M41 to the signal lines Sig1 to Sig4. A read capacitor (not shown) is added to each of the signal lines Sig1 to Sig4. The charges accumulated in the MIS photoelectric conversion devices M11 to M41 are transferred to the read capacitor through the TFTs. For example, the read capacitor added to the signal line Sig1 corresponds to the sum of (four) interelectrode capacitances (Cgs) between the gates and sources of the TFTs T11 to T41 connected to the signal line Sig1. The charges transferred to the signal lines Sig1 to Sig4 are amplified by the semiconductor chip 6 (Amp IC) connected to the read circuit 7 shown in FIG. 4 and transferred to and held by sample-and-hold capacitors CL1 to CL4 (not shown) in the read circuit 7. Next, a pulse is applied from a shift register (not shown) in the read circuit 7 shown in FIG. 4 to switches Sr1, Sr2, Sr3, and Sr4 (not shown) in the read circuit 7 in this order (FIG. 12). Accordingly, the signals held by the sample-and-hold capacitors CL1 to CL4 are output from the read circuit 7 in an order of CL1, CL2, CL3, and CL4. As a result, as shown in FIG. 12, the photoelectric conversion signals of the MIS photoelectric conversion devices M11 to M41 of one row are sequentially output as Vout. The read operation is executed in a similar manner for the MIS photoelectric conversion devices M12 to M42 of the second row, the MIS photoelectric conversion devices M13 to M43 of the third row, and the remaining devices. The read circuit 7 is the same as a conventionally known read circuit, and the structure in the read circuit 7 will be omitted.

According to the first embodiment, the TFT sensors for AEC are arranged on the insulating substrate 1 independently of the MIS photoelectric conversion devices. X-rays are not attenuated by the AEC radiation detection pixels before the X-rays become incident on the MIS photoelectric conversion devices. Hence, a high image quality can be obtained.

In the AEC radiation detection region 5, the TFT sensors can selectively be arranged at necessary positions. In an image sensing radiation detection pixel adjacent to an AEC radiation detection pixel, the opening ratio of the MIS photoelectric conversion device decreases. However, the decrease in area can easily be compensated for by image correction after the read.

Some of the pixel regions 4 each of which is formed by a set of pixels connected to the same TCP are set as the AEC radiation detection regions 5. In each AEC radiation detection region 5, the AEC radiation detection pixels are arranged. For this reason, the wiring lines (gate line GL, source line SL, and drain line DL) connected to the AEC radiation detection pixels can easily be led to the read TCP.

Each read TCP has the spare wiring lines G, S, and D at two side portions. When the spare wiring lines G, S, and D are connected to predetermined circuits (the DC power supplies 8 and 9 and the amplifier 10) in the read device 2, the AEC radiation detection pixels can be connected to the predetermined circuits. Hence, the radiographic apparatus can be manufactured at a low cost.

As a characteristic feature, the read TCP according to the preferred embodiment of the present invention has a plurality of spare wiring lines. In addition, if the read TCP is to be connected to a necessary AEC region, it is connected to predetermined circuits through the above-described spare wiring lines. That is, the read TCP sometimes uses the spare wiring lines and sometimes does not use the spare wiring lines.

When all spare wiring lines that are not used are directly connected to ground, a stable state can be maintained with respect to external noise or static electricity.

In other words, by using TCPs having spare wiring lines, not only AEC sensor driving and output read but also environment stability can simultaneously be achieved. In addition, TCPs of a plurality of types need not be prepared, and a high quality and low cost can be achieved.

Figure 9:
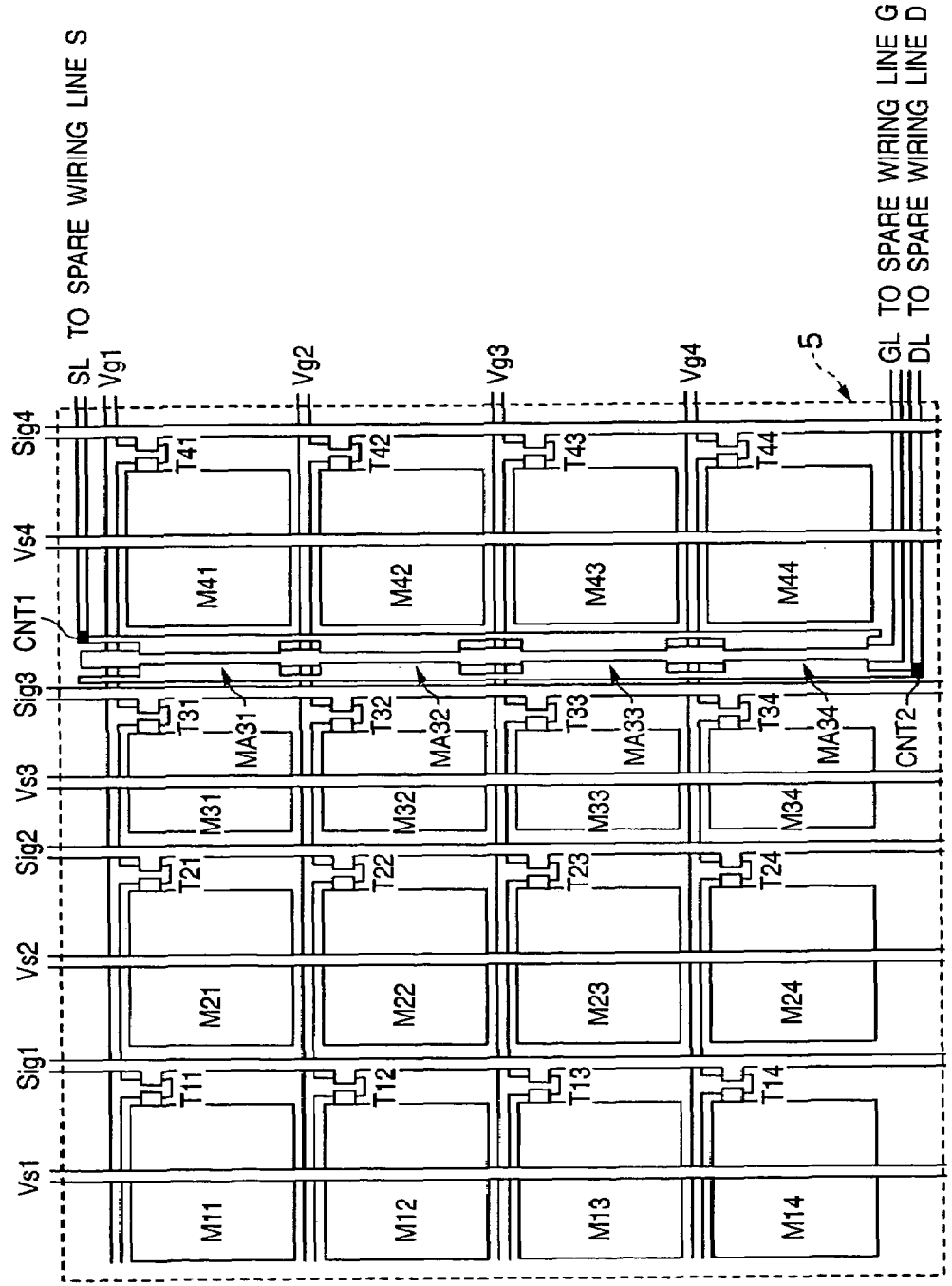
FIG. 9 is a schematic view showing a modification to the first embodiment.

In the first embodiment, the wiring lines of the AEC radiation detection pixels are connected to read TCPs. However, as shown in FIG. 9, they may be connected to driving TCPs. In this case, for example, pixel layout shown in FIG. 3 is employed. As for the layout of wiring lines, the source line SL and drain line DL of each AEC radiation detection pixel are connected to a wiring line arranged in the gate wiring layer (the same wiring layer as that of the gate line GL) through contact holes CNT1 and CNT2, respectively. The DC power supplies 8 and 9 and the amplifier 10 are arranged in the gate driving device.

The bias line on the insulating substrate 1 need not always be shared only in the AEC radiation detection region but may be shared in, e.g., all the pixel regions 4.

In the example shown in FIGS. 2 and 3, 4 (rows)×4 (columns) (=16) devices are arranged in one AEC radiation detection region. However, the number of devices is not limited to this. For example, a total of 2,000×2,000 pixels may be arranged on the insulating substrate 1.

In this embodiment, a MIS photoelectric conversion device is used as the first semiconductor conversion device. However, a PIN photoelectric conversion device may be used. The image sensing radiation detection pixel may have either a planar structure in which the first semiconductor conversion device and switching device are formed in the same layer or a multilayered structure in which the first semiconductor conversion device is formed on the layer with the switching device. In addition, the first semiconductor conversion device may be a conversion device which uses a direct conversion film such as amorphous selenium (a-Se) or polycrystalline CdS and directly converts radiation into an electrical signal. A radiographic apparatus which directly converts radiation into an electrical signal without using any scintillator may be used.

Second Embodiment

Figure 5:
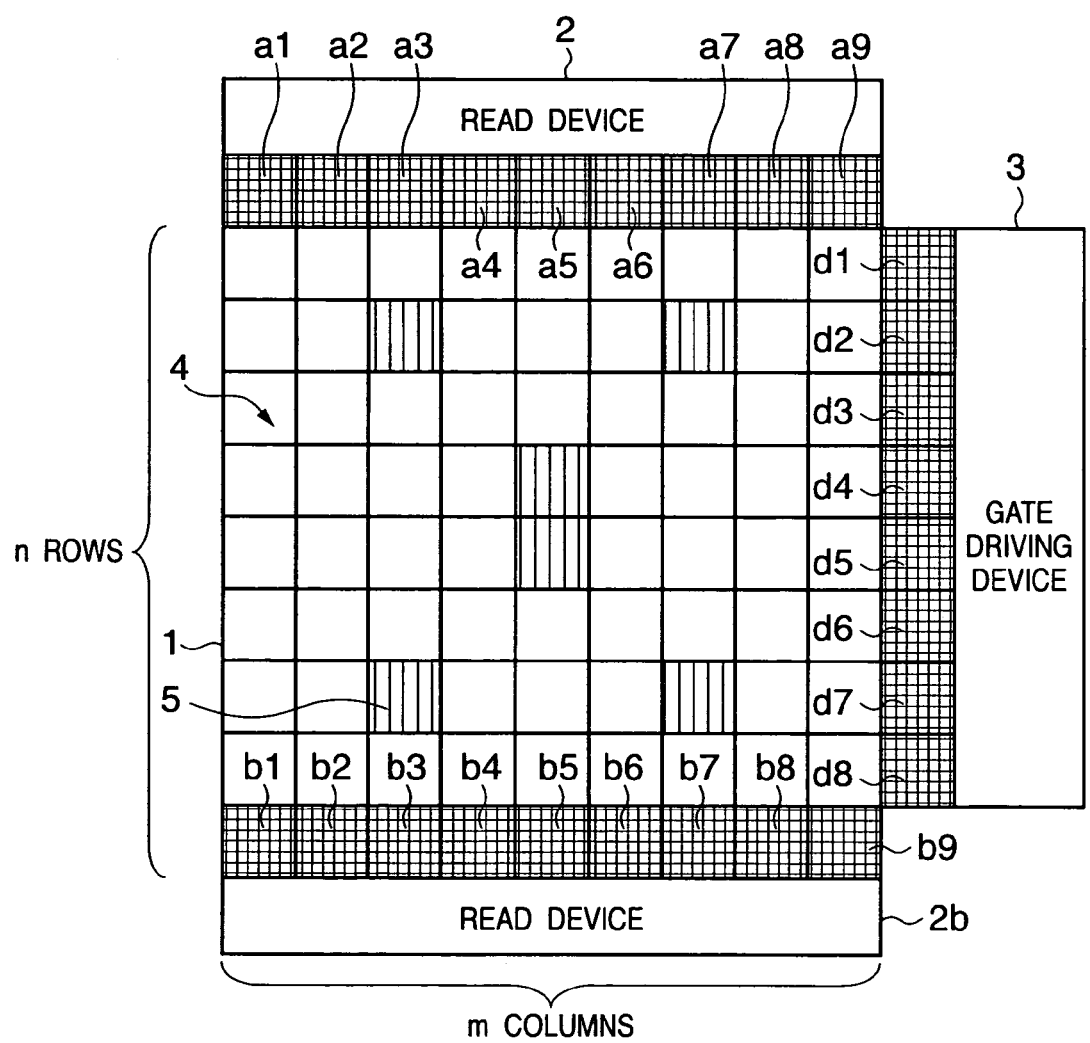
FIG. 5 is a schematic view showing the layout of a radiation detection apparatus according to the second embodiment of the present invention.

The second embodiment of the present invention will be described next. FIG. 5 is a schematic view showing the layout of a radiation detection apparatus according to the second embodiment of the present invention.

Even in this embodiment, as in the first embodiment, m (columns)×n (rows) image sensing radiation detection pixels are arranged in a matrix on an insulating substrate 1. The image sensing radiation detection pixels of m columns are divided into, e.g., nine groups. The image sensing radiation detection pixels of n rows are divided into, e.g., eight groups. The image sensing radiation detection pixels of each group are connected to a corresponding one of driving TCPs d1 to d8. Of the image sensing radiation detection pixels of m columns divided into nine groups, each of pixels connected to one of the driving TCPs d1 to d4 is connected a corresponding one of read TCPs a1 to a9. Each of pixels connected to one of the driving TCPs d5 to d8 is connected a corresponding one of read TCPs b1 to b9.

The m (columns)×n (rows) image sensing radiation detection pixels are divided into 72 pixel regions 4 in accordance with the division. Image sensing radiation detection pixels belonging to one pixel region 4 are connected to the same read TCP and driving TCP. The read TCPs a1 to a9 are connected to a read device 2. The read TCPs b1 to b9 are connected to a read device 2b. The driving TCPs d1 to d8 are connected to a gate driving device 3. The read TCPs b1 to b9 have the same structure as that of the read TCPs a1 to a9. The read device 2b has the same structure as that of the read device 2. The read TCPs a1 to a9 and read TCPs b1 to b9 can be arranged in equal numbers on two opposing sides of the insulating substrate 1 while sandwiching the conversion portions that convert radiation into an electrical signal.

In this embodiment, six of the 72 pixel regions 4 have a plurality of AEC radiation detection pixels. The read TCPs a3, a5, a7, b3, b5, and b7 are specific printed wiring boards.

In the second embodiment having the above arrangement, image sensing radiation detection pixels of two rows can simultaneously be read-accessed. Hence, the data read from the image sensing radiation detection pixels can be completed in a time ½ that of the first embodiment.

Alternatively, the image sensing radiation detection pixels of n rows may be divided into, e.g., pixels of n/2 rows on the upper and lower sides by a boundary line parallel to the two opposing sides of the insulating substrate 1. AEC radiation detection regions 5 may be arranged in line symmetry on the basis of the boundary line.

Figure 6:
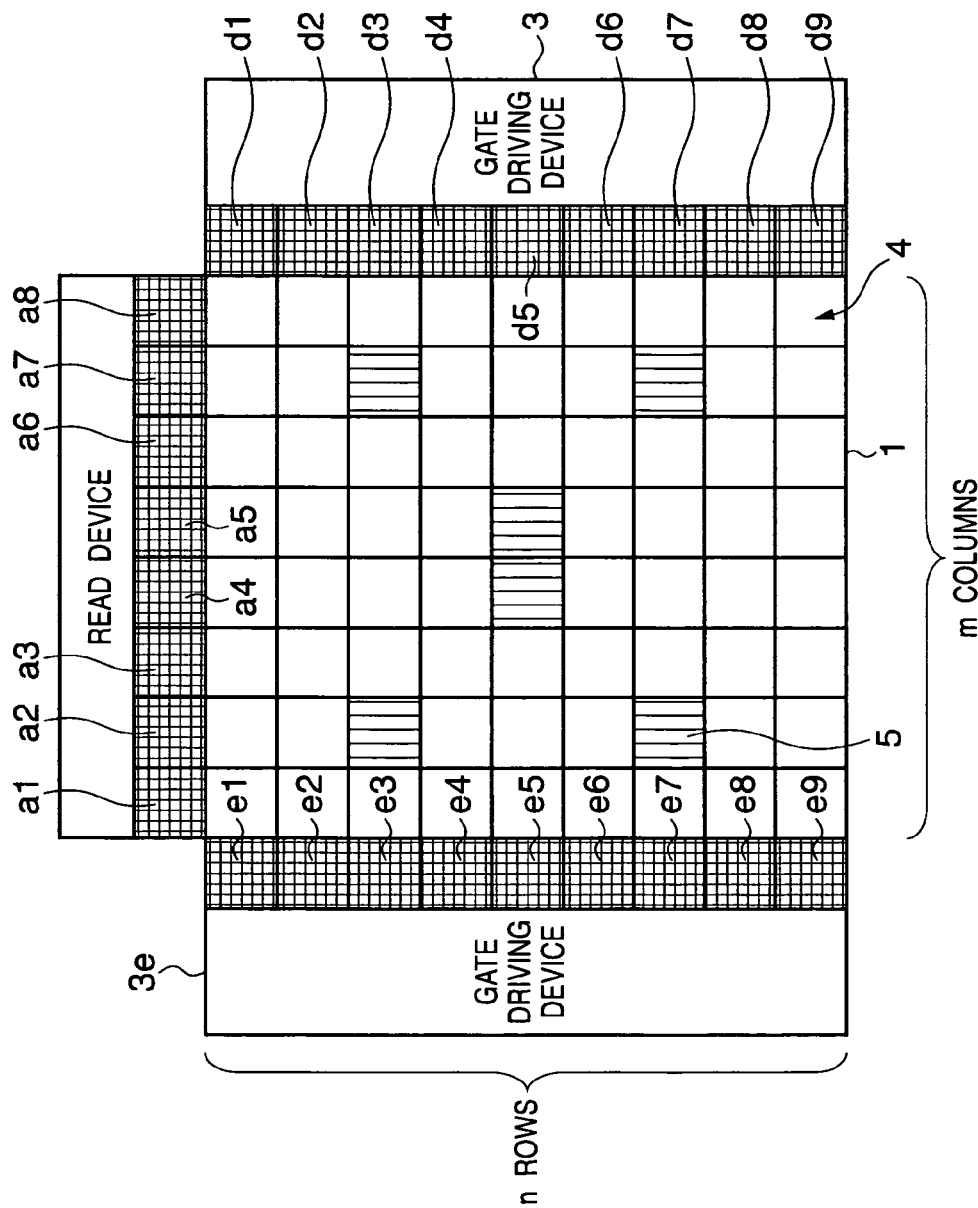
FIG. 6 is a schematic view showing the layout of a radiation detection apparatus according to a modification to the second embodiment of the present invention.

As shown in FIG. 6, the image sensing radiation detection pixels of m columns are divided into, e.g., eight groups. The image sensing radiation detection pixels of n rows are divided into, e.g., nine groups. In addition, a gate driving device 3e may be arranged in addition to the gate driving device 3. At this time, the image sensing radiation detection pixels of m columns may be divided into, e.g., pixels of m/2 rows on the right and left sides, and the AEC radiation detection regions 5 may be arranged in line symmetry on the basis of the boundary.

In this case, a driving TCP d9 is added to the driving TCPs d1 to d8 on the side of the gate driving device 3. In addition, driving TCPs e1 to e9 are arranged on the side of the gate driving device 3e. The driving TCPs d9 and e1 to e9 have the same structure as that of the driving TCPs d1 to d8. The gate driving device 3e has the same structure as that of the gate driving device 3. The driving TCPs d3, d5, d7, e3, e5, and e7 are specific printed wiring boards.

Figure 8A:
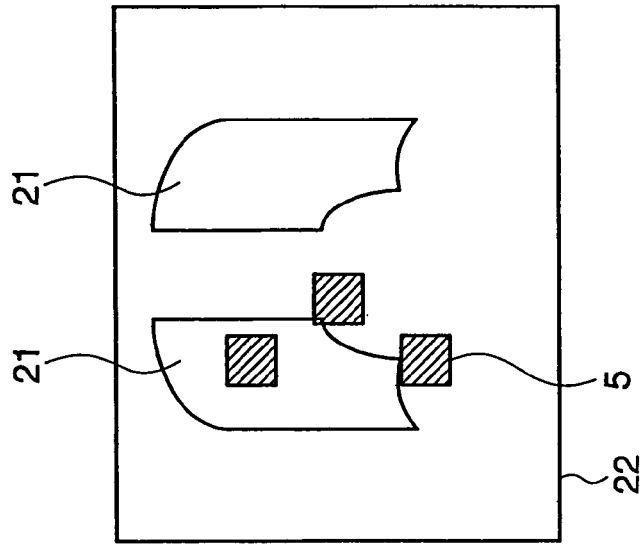
FIGS. 8A and 8B are schematic views showing the positional relationship between AEC radiation detection regions and a pulmonary part in a conventional radiographic apparatus.
Figure 8B:
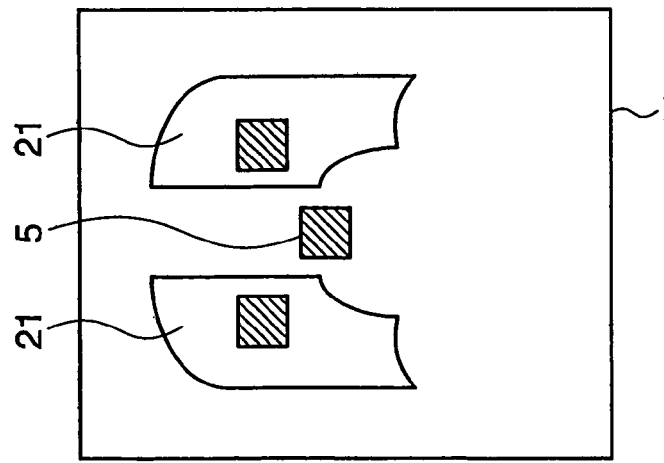

When the planar shape of the FPD is a rectangular shape or, for example, a rectangular shape with a half film size, like a conventional silver halide film, photographing is executed while the longitudinal side of the FPD is set in the vertical or horizontal direction in accordance with the physique of the person (examination subject) to be photographed. However, when the FPD is rotated and used, the two or three conventional AEC radiation detection regions incorporated in the FPD as shown in FIGS. 8A and 8B do not suffice. More specifically, when the longitudinal side of the FPD is set in the vertical direction, as shown in FIG. 8A, the two or three AEC radiation detection regions 5 are optimally arranged at the position of a pulmonary part 21. However, when the longitudinal side of the FPD is set in the horizontal direction, as shown in FIG. 8B, some AEC radiation detection regions 5 are not arranged at the position of the pulmonary part 21. This arrangement is not optimum.

To the contrary, in the preferred embodiment of the present invention, when the AEC radiation detection regions 5 are arranged at six portions of the FPD, as shown in FIG. 5 or 6, the AEC radiation detection regions 5 are arranged at optimum positions in both the portrait and landscape modes, as shown in FIGS. 7A and 7B. More specifically, independently of whether an FPD 22 is set in the portrait mode, as shown in FIG. 7A, or in the landscape mode, as shown in FIG. 7B, the arrangement of the AEC radiation detection regions 5 with respect to the pulmonary part 21 is optimum.

As described above, when spare wiring lines are arranged at two side portions of each. TCP to make it possible to arrange the AEC radiation detection regions for each TCP. Since the AEC radiation detection regions can easily be arranged at necessary portions, the AEC radiation detection regions 5 can be arranged at optimum positions independently of whether the portrait mode or landscape mode is set. In addition, the radiographic apparatus can be manufactured at a low cost.

In this embodiment, a MIS photoelectric conversion device is used as the first semiconductor conversion device. However, a PIN photoelectric conversion device may be used. The image sensing radiation detection pixel may have either a planar structure in which the first semiconductor conversion device and switching device are formed in the same layer or a multilayered structure in which the first semiconductor conversion device is formed on the layer with the switching device. In addition, the first semiconductor conversion device may be a conversion device which uses a direct conversion film such as amorphous selenium (a-Se) or polycrystalline CdS and directly converts radiation into an electrical signal. A radiographic apparatus which directly converts radiation into an electrical signal without using any scintillator may be used.

(Application Example)

Figure 10:
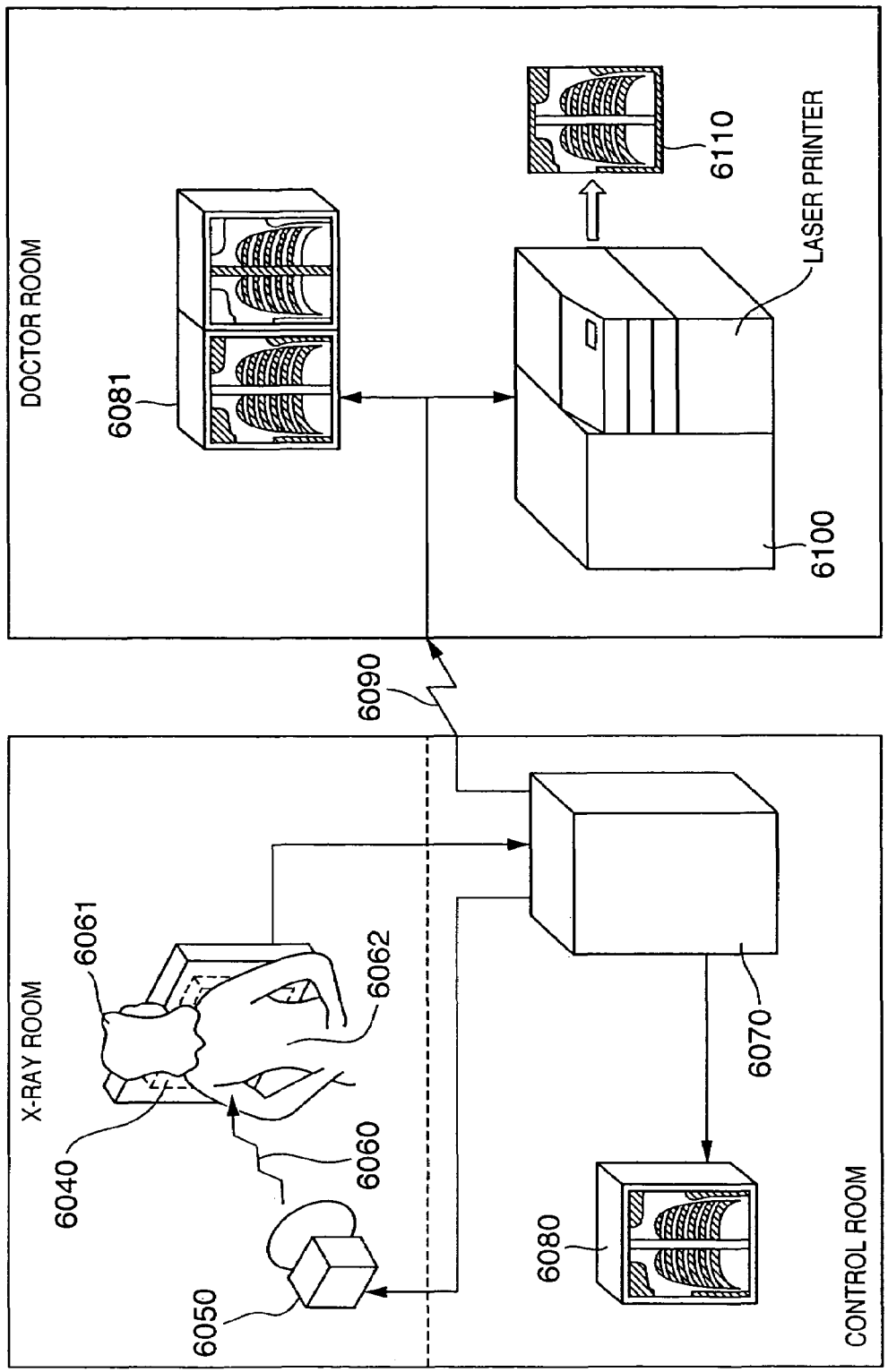
FIG. 10 is a schematic view showing an application example of the radiographic apparatus according to the preferred embodiment of the present invention to a radiographic system.

A radiographic system which uses the radiographic apparatus according to the preferred embodiment of the present invention will be described below. FIG. 10 is a schematic view showing an application example of the radiographic apparatus according to the preferred embodiment of the present invention to a radiographic system.

X-rays 6060 generated by an X-ray tube 6050 are transmitted through a breast part 6062 of a patient or examination subject 6061 and become incident on a radiation detection apparatus (radiographic apparatus) 6040 as shown in FIG. 1. The incident X-rays contain the internal information of the patient 6061. In accordance with the incidence of the X-rays, the scintillator (phosphor) emits light. The light is photoelectrically converted by the photoelectric conversion devices of the sensor panel so that electrical information is obtained. The radiation detection apparatus (radiographic apparatus) 6040 outputs this information to an image processor 6070 as an electrical signal. The image processor 6070 converts the electrical signal output from the radiation detection apparatus (radiographic apparatus) 6040 into a digital signal, image-processes the digital signal, and outputs it to a display 6080 in a control room. The user can observe the image displayed on the display 6080 and obtain the internal information of the patient 6061.

The image processor 6070 can also transfer the electrical signal output from the radiation detection apparatus (radiographic apparatus) 6040 to a remote site through a transmission processing unit such as a telephone line 6090 and display an image on a display 6081 at another site such as a doctor room. The electrical signal output from the radiation detection apparatus (radiographic apparatus) 6040 can also be stored in a recording medium such as an optical disk so that a doctor who is at the remote site can do diagnosis by using the recording medium. The image information can also be recorded on a film 6110 by using a film processor 6100.

In this application example, the radiographic apparatus may use a conversion device which uses a direct conversion film such as amorphous selenium (a-Se) or polycrystalline CdS and directly converts radiation into an electrical signal without using any scintillator.

As described above, according to the present invention, since the second semiconductor conversion devices are collectively arranged for each printed wiring board. Hence, in designing the printed wiring boards, they can easily be arranged at necessary positions, and the radiographic apparatus can be manufactured at a low cost.

As many apparently widely different embodiments of the present invention can be made without departing from the spirit and scope thereof, it is to be understood that the invention is not limited to the specific embodiments thereof except as defined in the appended claims.

What is claimed is:

1. A radiographic apparatus comprising:
   a substrate;
   a conversion portion having a plurality of pixels arranged on said substrate in a matrix, each pixel including a first semiconductor conversion device which converts radiation into an electrical signal and a switching device which is connected to said first semiconductor conversion device;
   a plurality of second semiconductor conversion devices arranged on said substrate to convert radiation into an electrical signal to detect the amount of radiation incident on said conversion portion; and
   a plurality of printed wiring boards which are respectively connected to said plurality of pixels,
   wherein said conversion portion includes a plurality of pixel regions each having at least one pixel; each of said plurality of pixel regions corresponding to respective one of said plurality of printed writing boards;
   said plurality of second semiconductor conversion devices are arranged in one or some of said plurality of pixel regions, and said second semiconductor conversion devices and said pixels arranged in the same pixel region are connected to the same printed writing board.

2. The apparatus according to claim 1, wherein
   control wiring lines for controlling an operation of said switching devices and signal lines for transmitting signals output from said first semiconductor conversion devices through said switching devices are arranged in said conversion portion, and
   said printed wiring board to which said second semiconductor conversion devices are connected is connected to the signal lines.

3. The apparatus according to claim 2, wherein said first semiconductor conversion device includes a first group of a first size semiconductor conversion devices and a second group of a second size semiconductor conversion devices; said second size being smaller than said first size, wherein said second group of said second size semiconductor conversion devices is arranged adjacent to said second semiconductor conversion devices.

4. The apparatus according to claim 3, wherein when said first semiconductor conversion devices are divided into two groups including the same numbers of first semiconductor conversion devices by a boundary line parallel to two opposing sides of said substrate, said second semiconductor conversion devices are arranged in line symmetry about the boundary line serving as an axis of symmetry.

5. The apparatus according to claim 1, wherein
said printing writing board has a semiconductor chip thereon, and said plurality of pixels are connected to said semiconductor chip and said second semiconductor conversion devices are not connected to said semiconductor chip.

6. The apparatus according to claim 5, wherein said printed writing board has a spare wiring line which is not connected to said semiconductor chip and said plurality of second semiconductor conversion devices are connected to said spare wiring line.

7. The apparatus according to claim 5, further comprising a read circuit which is connected to said semiconductor chip, and a circuit which is separated from said semiconductor chip and connected to said spare wiring line to detect the amount of radiation.

8. A radiographic system comprising:
a radiation source for generating radiation;
a radiation detection apparatus of claim 1 for converting the radiation incident from said radiation source into an electrical signal;
an image processor for image-processing the electrical signal output from said radiation detection apparatus; and
a display for displaying the electrical signal image-processed by said image processor.

9. The system according to claim 8, wherein
the system further comprises a transmission processing unit arranged to transmit the electrical signal output from said image processor, and
said image processor outputs the signal to said display through said transmission processing unit.

* * * * *

UNITED STATES PATENT AND TRADEMARK OFFICE
CERTIFICATE OF CORRECTION

PATENT NO. : 7,078,701 B2
APPLICATION NO. : 10/762611
DATED : July 18, 2006
INVENTOR(S) : Ishii et al.

Page 1 of 1

It is certified that error appears in the above-identified patent and that said Letters Patent is hereby corrected as shown below:

On Front page insert:

"(30) Foreign Application Priority Data
Jan 27, 2003 (JP).............................2003-017807"

Signed and Sealed this

Seventh Day of November, 2006

JON W. DUDAS
*Director of the United States Patent and Trademark Office*